United States Patent [19]

Ressler et al.

[11] Patent Number: 5,207,828
[45] Date of Patent: May 4, 1993

[54] TEMPERATURE-STABLE PIGMENT-COLORED PLASTIC COMPOSITIONS, PROCESS FOR PRODUCING THEM AND MEANS FOR CONDUCTING THE PROCESS

[75] Inventors: Ingrid Ressler, Goslar; Gerhard Adrian; Walter Horn, both of Langelsheim, all of Fed. Rep. of Germany; Donald Gray, Piscataway, N.J.

[73] Assignee: Dr. Hans Heubach GmbH & Co KG, Fed. Rep. of Germany

[21] Appl. No.: 905,141

[22] Filed: Jun. 23, 1992

Related U.S. Application Data

[63] Continuation of Ser. No. 445,593, Nov. 7, 1989, abandoned.

[30] Foreign Application Priority Data

Apr. 7, 1988 [DE] Fed. Rep. of Germany ....... 3811693
Mar. 2, 1989 [DE] Fed. Rep. of Germany ....... 3906670

[51] Int. Cl.$^5$ .......................... C09C 1/20; C09C 1/14; C09D 5/16; C09D 5/18
[52] U.S. Cl. .................... 106/433; 106/400; 106/401; 106/434; 106/18.13
[58] Field of Search ............... 106/433, 434, 400, 401, 106/18.13; 252/400.4, 400.41

[56] References Cited

U.S. PATENT DOCUMENTS 3,942,998 3/1976 Higgins .............................. 106/434
4,491,619 1/1985 Biermann et al. .................. 428/403

FOREIGN PATENT DOCUMENTS 1068606 12/1979 Canada .
0090241 10/1983 Fed. Rep. of Germany .

OTHER PUBLICATIONS

C.A. 91:141725f; "Polymer Composition"; Vaisman, Y.; abstract of USSR 678,057; 5 Jul. 1979.
European Search Report; pp. 1-3.

Primary Examiner—Mark L. Bell
Assistant Examiner—Scott L. Hertzog
Attorney, Agent, or Firm—Venable, Baetjer, Howard & Civiletti

[57] ABSTRACT

Plastics are described which contain, in intimate contact with the pigments, boric acid in a quantity of 1 to 20% by weight, preferably 2 to 15% by weight, of the dry pigment. Also described is the process for producing said plastics, in which the usual plastic granules or powders are mixed with the above-mentioned quantities of boric acid before, during or after addition of the pigment, and the boric acid is brought into intimate contact with the pigment before further processing, of the particulate plastic is mixed with the pigment containing the above mentioned quantities of boric acid before being subjected to further processing under thermal stress.

32 Claims, No Drawings

TEMPERATURE-STABLE PIGMENT-COLORED PLASTIC COMPOSITIONS, PROCESS FOR PRODUCING THEM AND MEANS FOR CONDUCTING THE PROCESS

This application is a continuation of application Ser. No. 07,445,593, filed Nov. 7, 1989 now abandoned.

In hot processing of pigment-colored plastic compositions, as Polyethylene (HDPE, LDPE), acrylonitrile butadiene styrene (ABS), polystyrene (PS), polyphenylene oxide (PPO), polycarbonate (PC) and polypropylene (PP), the pigments are subjected, e.g. upon injection molding or extrusion, to a temperature strain that may lead to changes in color of the pigments.

Various methods are known in order to improve the temperature stability in the case of inorganic pigments. Methods which deal with the application of a homogeneous amorphous silicate layer, also in combination with other metal oxides, have been described specifically for chromate pigments in the U.S. Pat. Nos. 3,370,971, 3,798,045, 3,929,500, 3,942,998, 4,017,328 and 4,059,549. Precipitation of these components takes place through the addition of dissolved metal salts and subsequent precipitation of the corresponding insoluble metal oxides by way of control of the pH. In that regard, a treatment with water-soluble boron compounds takes place beforehand according to the U.S. Pat. Nos. 3,929,500 and 3,942,998.

The improvement in thermal stability that is obtained in this way is to be termed good to very good for many purposes of use.

Attempts made at attaining, by combining the difficultly soluble metal oxides mentioned in the said patents, a further improvement in the thermal stability in conjunction with processing techniques involving a high temperature strain over an extended residence time or, resp., processing time did not provide the desired results.

Another problem is improvement of light-fastness. To do that f.i. according to European patent application 245 984 rutil is coated with a layer of $SiO_2$ and $B_2O_3$ in form of sodium borate. For improvement of thermal stability of iron(II)pigments in magnetic tapes against oxidation by air according to German patent application 32 11 327 f.i. the Fe(II)-containing pigments are provided with a coating of a boron-oxygen-compound. If finished pigments are to undergo this treatment with boric compounds these pigments are converted, especially by tempering at temperatures of up to 500° C. in an inert atmosphere or an atmosphere containing only small amounts of oxygen. Thus, $B_2O_3$ or an anhydrous borate remains in the pigment. When an iron pigment treated in such a manner, that is when using the boron compound in an anhydrous form and which is also not able to split off water, practically no improvement of thermal resistency of a plastic composition is obtained which also applies to a lead chromate treated in the same manner.

It is the object of the invention to improve heat stability of pigment-colored plastic compositions, especially of thermoplastic compositions, that is to raise the temperature, at which discoloring of pigment-colored plastic compositions occurs.

According to the invention, this problem could be solved by way of added substances, which generally improve the temperature stability of inorganic pigments that are not thermally stable enough, such as for instance iron oxides, lead chromates and lead molybdates, upon processing in synthetic material systems, and which provide an additional improvement in thermal stability at high temperatures and longer processing times of the thermoplast/pigment-system specifically in the case of the chromium yellow pigments and molybdate red pigments provided with a coating of dense amorphous silicon dioxide. Corresponding improvements in dependence upon thermal sensitivity could also be attained in the case of organic pigments, such as e.g. azo pigments (Pigment Yellow 154, Pigment Red 144), isoindoline pigments (Pigment Yellow 139) and phthalocyanine pigments (Pigment Blue 15:3).

It turned out surprisingly that a distinct improvement in thermal stability of pigment-colored plastic compositions could be achieved by the use of from 1 to 20% by weight, preferably from 2 to 15% by weight and particularly from 3 to 10% by weight, based on the starting pigment, of boric acid independent from the mode of its addition if boric acid at that time when the pigment-colored plastic composition is put to use, is present in a form, which is still able to melt and to split off water. This applies especially to $H_3BO_3$ but also f.i. for $HBO_2$ to a lesser extent. Ortho-boric acid gives by far the best results and thus all percent by weight, shown here, are based on this compound.

The amount of boric acid is based upon starting pigment because this is easier to calculate for dosaging. When basing it on factually used, stabilized end pigment, this denotes upon 20% of addition a change only of the upper limit to about 17%, while the lower limit stays at about 1%. Based upon stabilized end pigment, this would in the case of the preferred range of from 3 to 10% be a lower limit of ca. 3% that nearly remains the same and an upper limit of ca. 9%.

Whereas metal oxides difficultly soluble in water are precipitated by known processes in the wet phase onto pigments through the addition of corresponding salt solutions and subsequent pH control, other ways had to be searched for in the case of the water-soluble boron compounds for having these compounds stay on the product upon work-up of the pigments. It turned out in that respect that the same improvement in thermal stability could be attained through the addition of these boron compounds to the pigment as such, hence to the wet pigment press cake from the filter press, meaning prior to drying of the pigment preparations, as well as also through the admixing of the boron compounds to the dry pigment powder, but also through addition of the boron compounds to the synthetic material as it is customarily used e.g. for injecting or extruding, for instance to the granulate or especially as a powder, upon previous, simultaneous or subsequent addition of the pigment to the mixture and good blending of pigment and boron compound.

The type of addition and the quantity of boron compounds remaining on the pigment differ substantially from the processes described in U.S. Pat. Nos. 3,929,500 and 3,942,998, where reference is made to a treatment of chrome yellow pigments and molybdate red pigments with boron compounds, in which respect however, only very minor proportions of the boron compounds remain on the pigment after filtration in filter presses due to the fact that these compounds are added before, during or after precipitation, but before the after-treatment with $SiO_2$ or, resp., $Al_2O_3$. The boron content in fact remaining in the end pigment and calculated as $B_2O_3$ amounts to from 0.015 to 0.1% by weight, based upon coated end pigment. Therefore, the processes described in the U.S. Pat. Nos. 3,929,500 and 3,942,998 are also to be regarded as being very uneconomical because almost the entire portions of boric acid compounds are through washing-out and filtering separated from the pigment again despite the addition of large quantities of boric acid compounds.

This also applies to European patent application 245 984 in which about 0.5% by weight Na-borate or $B_2O_3$ respectively are present. The iron pigments of German patent application 32 11 327 may contain up to 4% boron-oxygen compound, which however, has no effect, probably because the boron compound is no longer able to melt and in any case is unable to split off water because of the final tempering.

It is possible through the application of the processes of boric acid treatment according to the invention to rapidly determine, for achieving better temperature stabilities, optimum amounts for the addition to the pigment press cake before drying or to the pigment after drying or to the synthetic material system before or upon pigment addition.

A positive influence on uniform application of the silicate or, resp., metal oxide layers is ascribed in U.S. Pat. Nos. 3,929,500 and 3,942,998 to the soluble boron compounds that are present in the precipitation solutions, even though these boron compounds do not remain in substantial proportions on the pigment.

It is assumed that the mode of effect of the boric acid is a different one when it is added to the washed press cake before drying or, resp., to the dried pigment or, resp., to the synthetic material/pigment mixture and, hence, the entire portions of the boron compound remain in the pigment or, resp., in the synthetic material/pigment mixture. The mode of effect of this boron compound that is essentially of boric acid is traced back to its low melting range (ca. 169° C.), which is in most instances in synthetic material processing attained or, resp., exceeded. The fact that the relatively low-viscous boric acid melt is developed in the high-viscous synthetic material melt is such as to improve the dispersability of the pigment in the synthetic material, so that a gentler incorporation of the pigment is ensured.

This also explains why $B_2O_3$ may be added to a wet pigment sludge or a filter press cake respectively if one only takes care that this $B_2O_3$ is essentially converted into boric acid and thus mainly is present as boric acid in the pigment which is used for coloring the plastic composition.

As far as the pigments used for the boric acid treatment contain silicate- and other metal oxide-stabilizing layers, these are yet further condensed through the presence and the incorporation of boric acid or, resp., boron oxide. It is to be assumed that the close chemical relation between silicates and borates in respect of the formation of amorphous glassy structures also plays a role in that connection.

Metal oxides, which are present as trace elements or result through partial pigment degradation, may possible also be bound to inactive metal borates through boric acid, which serves to prevent synthetic material degradation reactions possibly initiated through metal oxides.

This mode of effect is obvious, particularly since it is also possible to improve thermal stability, by adding boric acid to commercial iron oxide pigments in thermo plastic compositions while this is not the case with the same pigments which have been treated with boric acid according to German patent application 32 11 327 and which have then been tempered.

Considering that it is also possible to improve, as stated, the thermal stability of organic pigments, it is assumed that boric acid functions in these pigment/synthetic material combinations as a radical blocker or, resp., radical trap, so that thermal degradation reactions are retarded. Photochemical degradation reactions are apparently also inhibited. as it was also possible to improve, through the boric acid addition, the light stability and weather-resistance of such systems.

The pigments which are stabilized by the addition of boric acid may have had various surface treatments For instance lead chromates and lead sulfochromates (chrome yellows) and lead molybdo chromates (molybdate oranges and reds) are sometimes treated with mineral oil to render them non-dusting These same pigments are also encapsulated in silica and then surface treated with rosin, plastolein or a stearate ester. Particularly beneficial effects have been obtained with mineral oil treated pigments and silica encapsulated stearate treated pigments.

The pigments may be incorporated into the plastic composition as part of any of the common formulations including both tint tones and mass tones. Particularly beneficial results have been obtained in the mass tones. Typical mass tones involve the use of between about 0.5 and 3 weight percent of pigment, based on the weight of plastic, with between about 1 and 2 percent being particularly preferred.

The tint tone formulations in which the pigment is used in a lower level in combination with an opacifying agent such as titanium dioxide are less preferred. The boric acid can reduce the color strength of such formulations to a greater extent than would be predicted from the amount of pigment which it displaces. For instance a tint tone formulation utilizing a mixture of pigment with 10% boric acid may show a 20% loss in color strength compared to a formulation an equal weight of pigment alone.

The pigments may be incorporated into the plastic in accordance with any of the common blending techniques including adding directly at the end use level and combining with a carrier at a substantially higher concentration and then adding this concentrate to the plastic (master batching). The carrier can be the same plastic as the plastic to be pigmented or it may be a compatible thermoplastic. For instance advantageous results have been obtained by dispensing boric acid stabilized pigments directly into ABS at end use levels and by master batching them into low density polyethylene at about ten times the desired end uses level and adding this concentrate to high density polyethylene. The pigment concentrate or the pigment can be combined with the plastic in any conventional manner. However, it is preferred to use melt shear mixing techniques such as extrusion blending or processing in a Banbury mixer. It is also preferred to prepare the concentrate using such melt shear mixing equipment.

The boric acid stabilization of the pigments can be advantageous employed in the coloring of any thermoplastic which when pigmented has a tendency to display discoloration under the time temperature conditions encountered in typical forming operations. Preferred resins include ABS and high density polyethylene. Beneficial results have also been obtained for polypropylene, polycarbonate, nylon, PPO (polyphenylene oxide) and blends of these resins. The boric acid stabilization should provide beneficial results in any pigmented resin in which the forming conditions can cause discoloration interactions between the resin and the pigment. Thus polyvinylchloride (PVC) may not obtain much benefit because of the low temperature at which it is typically processed.

The pigments with which beneficial results have been obtained include both the organic pigments and the inorganic pigments which are suitable for the coloring of thermoplastics. The pigments which are fairly stable under the time temperature conditions typically encountered in forming thermoplastics but which have the tendency to engage in discoloration interactions with the host thermoplastic at the extremes of these conditions are preferred. Included among these pigments are both the unmodified and modified lead chromates marketed as chrome yellows and molybdate oranges. This is as opposed to for instance the alpha phase phthalocyanines which have a tendency to undergo a crystal phase transformation and resultant change in color at elevated temperatures. This color change might mask any benefit obtained from the boric acid stabilization. Another contrast of interest is between various forms of Pigment Red 48. The calcium precipitated 48.2 has a tendency to be solubilized in ABS thus masking any beneficial effects from boric acid stabilization while the 48.4 manganese salt does display an observable benefit.

Some beneficial results have been obtained with iron oxide pigments This benefit has been obtained with pigments in which the iron is already in the ferric or $+3$ oxidation state. This is in contrast to the teachings of U.S. Pat. No. 4,491,619 in which ortho boric acid is used to inhibit the oxidation of iron in the ferrous or $+2$ state in iron oxide pigments which have a significant content of black iron oxide.

The Examples which follow serve to explain the invention.

EXAMPLE 1

19 g of a lead chromate, corresponding to C.I. Pigment Yellow 34, CONST. NO. 77600, which is stabilized lightly in known manner with minor amounts of silicic acid and/or metal oxides, were homogeneously blended with 1 g of boric acid.

A lead chromate-pigment preparation (pigment 2) was obtained, which exhibited a distinctly better temperature stability upon processing by injection molding, for instance in high-pressure polyethylene, as opposed to the one with the same lead chromate pigment without boric acid (pigment 1). So as to check on the temperature stability, 20 g of the pigment preparation or, resp., of the pigment were mixed with 1000 g of high-pressure polyethylene granulate and injected on the injection molding machine at 250° C. (30 sec. residence time) and 300° C. (5 min. residence time) to form 50×70×2 mm large chips. Subsequently thereto, the color difference DE was measured by means of the Zeiss-color measuring apparatus RFC 3, standard type of light D 65, the chip injected at 250° C. (30 sec. residence time) respectively having served as 0-sample. The color differences DE are set forth in Table 1.

EXAMPLE 2

1000 g of high pressure polyethylene granulate were mixed with 2 g of boric acid and subsequently thereto there were added 18 g of a commercial lead sulfochromate (pigment 4) of the type C. I. Pigment Yellow 34, CONST. NO. 77603, medium-stabilized with $SiO_2$ and metal oxides. Processing and temperature loading on the injection molding machine occurred in the manner as described in Example 1. Thereafter, the color differences DE were measured by comparison with the corresponding sample without addition of boric acid (pigment 3), respectively over against the corresponding 0-sample (see Example 1). The color differences DE are set forth in Table 1.

EXAMPLE 3

40 g of press cake (50% solid substance) of a molybdate red stabilized with $SiO_2$ and $Sb_2O_3$, corresponding to C.I. pigment Red 104, CONST. NO. 77605, were kneaded with 1.5 g of boric acid and dried without washing and ground. 20 g of the resultant boric acid-containing molybdate red pigment (pigment 6) were mixed, as described in Example 1, with high pressure polyethylene granulate and synthetic material chips produced on the injection molding machine, there having been used for comparison purposes the corresponding pigment without addition of boric acid (pigment 5), and the color difference values DE having been measured respectively over against the 0-sample (see Example 1). The color differences DE are set forth in Table 1.

EXAMPLE 4

A lead sulfochromate pigment, corresponding to C.I. Pigment Yellow 34, CONST. NO. 77603, according to U.S. Pat. No. 3,929,500 was produced in a manner such that 10% of boric acid were added after precipitation, but before water glass stabilization (pigment 7).

The treatment with boric acid carried out in this manner according to U.S. Pat. No. 3,929, 500 leads to the result that the principal amount of the boric acid is separated from the pigment again upon pigment workup through filtration in a filter press with subsequent washing out of the electrolytes.

Analogously thereto, the same pigment was produced without any addition of boric acid in the wet phase, and 7% of boric acid (pigment 8) were admixed to the dried, completely worked-up pigment. Both pigment preparations were subjected in high pressure polyethylene (2% of pigment) to the temperature test on the injection molding machine described in Example 1, and the color differences of the resultant synthetic material chips were measured. Injection molding chips produced at 250° C., 30 sec., again served as the 0-sample. The color differences DE are set forth in Table 1.

EXAMPLE 5

8 of a commercial iron oxide yellow were homogeneously blended with 1 g of boric acid (pigment 10), and thereafter mixed with 1 kg of high pressure polyethylene granulate. The mixture was subjected such as described in Example 1 to the temperature test at 300° C. (5 min. residence time) on an injection molding machine, the iron oxide yellow without addition of boric acid (pigment9) having been reverted to for comparison purposes. The measured color differences DE again pertain to the injection molded chips prepared at 250° C. (30 sec. residence time). The color differences DE are indicated in Table 1.

EXAMPLE 6

A commercial lead sulfochromate stabilized with $SiO_2$ and $Sb_2O_3$, produced adhering to Cerman Patent 12 24 858, corresponding to C. I. Pigment Yellow 34, CONST. NO. 77603, was precipitated in conventional manner, stabilized, filtered, and the filter press cake (ca. 50% solid substance) mixed with 9% by weight of boric acid anhydride, based upon solid substance, and thereupon the preparation was dried at 105° C. (pigment 12). 2 o g of the lead sulfochromate-boric acid preparation (pigment 12) were mixed, as described in Example 1, with 1000 g of high pressure polyethylene granulate, and the corresponding synthetic material chips were produced with the aid of the injection molding-plasticizing screw. For comparison, the same pigment without boric acid addition (pigment 11) was reverted to, and the color differences were measured over against the 0-samples (see Example 1). The color differences are stated in Table 1.

When boric acid anhydride is present as such in a finished pigment there is no effect. In the present case, however, the anhydride was added to the wet filter press cake and mixed for a sufficient time to transfer the anhydride essentially to boric acid.

EXAMPLE 7

A lead sulfochromate with a coating of dense amorphous $SiO_2$, prepared according to U.S. Pat. No. 4,059,459, was mixed, after drying, with 7% by weight of boric acid (pigment 14), and, as described in Example 1, 20 g thereof were mixed with 1000 g of high pressure polyethylene granulate, and corresponding synthetic material chips were produced with the aid of the injection molding-plasticizing screw. Correspondingly, there were produced chips with the pigment without boric acid addition (pigment 13), and the color differences DE were again measured by comparison with the respective 0-sample (see Example 1). The color differences DE are set forth in Table 1.

EXAMPLE 8

10 g of a commercial azo pigment (C.1. Pigment Yellow 154) were mixed with 1 g of boric acid and 1000 g of high pressure polyethylene granulate. This mixture (synthetic material with pigment 16) was injected with the aid of an injection molding-plasticizing screw at 250° C. (30 sec. residence time) and 270° C. (5 min. residence time) to chips of a size of 50×70×2 mm. Subsequently thereto, there was, as described in Example 1, measured the color difference DE with the Zeiss color measuring apparatus, standard type of light D 65, in which regard the chip injection-molded at 250° C. (30 sec. residence time) served respectively as 0-sample. For comparison, it was reverted to the corresponding pigment (pigment 15) without boric acid, it was mixed with the high pressure polyethylene granulate, and the corresponding chips produced, as described. The color differences are set forth in Table 2.

EXAMPLE 9

Synthetic material chips were produced at 250° C., 30 sec. and 270° C., 5 min., in a corresponding manner, such as described in Example 8, with the measure, however, that at first 1000 g of high pressure polyethylene granulate were mixed with 1 g of boric acid and thereafter with 10 g of isoindoline yellow (C.I. pigment Yellow 139) (pigment 18), the chips being produced with the aid of the injection molding-plasticizing screw; thereafter, the color difference DE was measured, it again having been reverted for comparison purposes to a mixture without boric acid (pigment 17). The color differences DE are indicated in Table 2.

EXAMPLE 10

As described in Example 8, pigmented high pressure polyethylene chips with an azo condensation pigment (C.I. Pigment Red 144) were produced with 10% boric acid, based upon pigment, (pigment 20) and without boric acid (pigment 19) at 250° C., 30 sec., and 270° C., 5 min., on the injection molding machine, and the color differences were measured. For the color differences DE, see Table 2.

EXAMPLE 11

In a corresponding manner such as described in Examples 8 and 9, a phthalocyanine blue-pigment (C.I. Pigment Blue 15:3) with 10% boric acid (pigment 22) and without boric acid (pigment 21) was used for pigmenting the high pressure polyethylene chips, and subsequent to injection molding-plasticizing the color differences DE of the chips obtained at 250° C., 30 sec., and 270° C., 5 min., were measured. For the color differences DE, see Table 2.

TABLE 1

| Example | 1 | | 2 | | 3 | | 4 | | 5 | | 6 | 7 |
|---|---|---|---|---|---|---|---|---|---|---|---|---|
| Pigment | 1 | 2 | 3 | 4 | 5 | 6 | 7 | 8 | 9 | 10 | 11 | 12 | 13 |
| Temperature stability Comparison with starting sample after straining at 250° C., 30 sec. High Pressure polyethylene, 2% pigmentation, incorporation by means of injection molding-plasticizing screw, residence time of 5 min., temperature: 300° C. | | | | | | | | | | | | | |
| Color difference DE Zeiss RFC 3, Standard type of light D 65 | 24.2 | 14.1 | 22.7 | 12.6 | 8.6 | 4.2 | 8.9 | 1.3 | 11.3 | 3.8 | 10.5 | 3.8 | 4.3 |

TABLE 2

| Example | 8 | | 9 | | 10 | | 11 | |
|---|---|---|---|---|---|---|---|---|
| Pigment | 15 | 16 | 17 | 18 | 19 | 20 | 21 | 22 |
| Temperature stability Comparison with starting sample after strain of 250° C., 30 sec. High pressure polyethylene, 2% pigmentation, incorporation by means of injection molding-plasticizing screw, residence time of 5 min., temperature: 270° C. | | | | | | | | |
| Color difference DE Zeiss RFC 3, | 15.2 | 8.3 | 6.3 | 0.3 | 2.2 | 0.5 | 1.9 | 0.3 |

TABLE 2-continued

| Example | 8 | 9 | | 10 | | 11 | |
|---|---|---|---|---|---|---|---|
| Pigment | 15 | 16 | 17 | 18 | 19 | 20 | 21 | 22 |
| Standard type of light D 65 | | | | | | | | |

EXAMPLE 12

A commercial lead chromate pigment, corresponding to C.I. Pigment Yellow 34, Constitution Number 77600 produced by the condensation of lead nitrate with sodium chromate followed by sequential coatings with aluminum sulfate and titinyl sulfate was tested for thermal stability in high density polyethylene both alone and mixed with either boric acid or sodium metaborate. The pigment without additive or with either 5 weight percent of boric acid or with 5 weight percent sodium metaborate was compounded at a mix ratio of 20 parts pigment to 80 parts of low density polyethylene in a Banbury mixing apparatus. This pigment concentrate was then compounded with high density polyethylene at a mix ratio of 1 part concentrate to 9.2 parts polyethylene. The pigmented resin containing approximately 2 weight percent of pigment was then injection molded to form color chips.

Each composition being evaluated was molded using a dwell time at temperature of 2 minutes and molding temperatures of about 200, 230, 260 and 290. The 204° C. molding of the composition with the boric acid was used as the standard and the color shift of each molding from this standard was measured using an automatic spectrophotometer. The results in terms of ΔE values according to the CIE LAB colormetric evaluation procedure were as follows:

| | Molding Temperature in °C. | | | |
|---|---|---|---|---|
| Composition | 204 | 232 | 260 | 288 |
| Pigment | 3.3 | 4.7 | 8.5 | 18.7 |
| Pigment with 5% of boric acid | control | 1.4 | 3.3 | 6.4 |
| Pigment with 5% sodium metaborate | 5.0 | 3.8 | 8.8 | 16.9 |

In this evaluation, the composition containing the boric acid displayed better color stability at 288° C. than either the pigment alone or the pigment admixed with sodium metaborate at 260° C. Therefore it can be characterized as having a thermal stability more than 50° F. greater than these two compositions.

In this field of technology so many variables are involved in the end use of a pigment that an absolute thermal stability can not be specified. For instance one end user may find a certain color shift acceptable while another finds it objectionable. One end user may use less abrasive techniques than another in dispersing the pigments in the plastic matrix and thus be able to tolerate higher molding temperatures. One end user may use longer dwell times in his molding equipment than another. Thus the practice has arisen of simply comparing a new pigment composition to a composition with which the art is familiar.

EXAMPLE 13

The same pigment as was used in Example A was tested under more abrasive conditions. In particular it was directly compounded with high density polyethylene in a Banbury at a ratio of 2 parts pigment or pigment containing 5% boric acid to 98 parts of polyethylene in a Banbury mixing apparatus. The molding was similar to that of Example A except that the standard was pigment without additive molded at 450° F., and the dwell time in the molder at temperature was 5 minutes. The resultant ΔE values were as follows:

| | Molding Temperature in °C. | | |
|---|---|---|---|
| Composition | 232 | 260 | 288 |
| Pigment | control | 6.7 | color so poor no measurement taken |
| Pigment with 5% boric acid | 7.1 | 3.6 | 6.5 |

These conditions were more severe than are typically encountered in actual use. In particular, most end users incorporate pigment by first preparing a concentrate as in Example A. Such a procedure subjects the pigment to less abrasion and consequently gives a composition with a higher heat stability.

We claim:

1. An improved temperature-stable pigment-colored plastic composition which comprises a thermoplastic synthetic resin, a pigment and a temperature-stabilizing additive capable of retarding the discoloration of the composition upon extended exposure to elevated temperatures, wherein said pigment is not an iron oxide pigment and wherein said additive consists of 1–15% by weight boric acid, based on starting pigment weight, in intimate contact with said pigment.

2. The plastic composition of claim 1, wherein said boric acid is 2–15% by weight.

3. The plastic composition of claim 1, wherein said boric acid is 3–10% by weight.

4. An injection moldable composition comprising a thermoplastic resin and an intimate dispersion of a sufficient amount of a pigment to impart noticeable color to the resin and a temperature-stabilizing additive capable of retarding the discoloration of the composition upon extended exposure to elevated temperatures, wherein said pigment is not an iron oxide pigment and wherein said additive consists of 1–15% by weight of boric acid based on starting pigment weight.

5. An extrudable or injection moldable pigmented composition according to claim 1 comprising an intimate dispersion of:
   a) a thermoplastic synthetic resin which is more susceptible to discoloration on exposure to elevated temperatures when pigmented than when said resin is not pigmented;
   b) a sufficient amount of a pigment to impart noticeable pigmentation to the resin, said pigment is not an iron oxide pigment; and
   c) a temperature-stabilizing additive capable of retarding the discoloration of the pigmented composition upon extended exposure to elevated temperatures, said additive consists of 1–15% by weight of boric acid based on starting pigment weight.

6. An extrudable or injection moldable pigmented composition according to claim 4 comprising an intimate dispersion of:
   a) a thermoplastic synthetic resin which is more susceptible to discoloration on exposure to elevated temperatures when pigmented than when said resin is not pigmented;

b) a sufficient amount of a pigment to impart noticeable pigmentation to the resin, said pigment is not an iron oxide pigment; and c) a temperature-stabilizing additive capable of retarding the discoloration of the pigmented composition upon extended exposure to elevated temperatures, said additive consists of 1–15% by weight of boric acid based on starting pigment weight.

7. A plastic composition according to claim 1, wherein said composition is in the form of a masterbatch composition suitable for the pigmentation of a thermoplastic synthetic resin which is more susceptible to discoloration on exposure to elevated temperatures when pigmented than when said resin is not pigmented comprising an intimate dispersion of a thermoplastic carrier resin, a high level of a pigment such that the composition can be substantially diluted and still display pigmentation and a temperature-stabilizing additive capable of retarding the discoloration of the composition upon extended exposure to elevated temperatures, wherein said pigment is not an iron oxide pigment and wherein said additive consists of 1–15% by weight of boric acid based on starting pigment weight.

8. A plastic composition according to claim 4, wherein said composition is in the form of a masterbatch composition suitable for the pigmentation of a thermoplastic synthetic resin which is more susceptible to discoloration on exposure to elevated temperatures when pigmented than when said resin is not pigmented comprising an intimate dispersion of a thermoplastic carrier resin, a high level of a pigment such that the composition can be substantially diluted and still display pigmentation and a temperature-stabilizing additive capable of retarding the discoloration of the composition upon extended exposure to elevated temperatures, wherein said pigment is not an iron oxide pigment and wherein said additive consists of 1–15% by weight of boric acid based on starting pigment weight.

9. A process for producing the composition of claim 1 which comprises mixing a resin granulate or powder with said temperature-stabilizing additive before, simultaneously with or after addition of said pigment and said additive is brought into intimate contact with said pigment before further processing.

10. A process for producing the composition of claim 4 which comprises mixing a resin granulate or powder with said temperature-stabilizing additive before, simultaneously with or after addition of said pigment and said additive is brought into intimate contact with said pigment before further processing.

11. A process for producing the composition of claim 1 which comprises mixing a resin granulate or powder with a pigment dispersion, said pigment dispersion comprising said pigment and said additive in intimate contact.

12. A process for producing the composition of claim 4 which comprises mixing a resin granulate or powder with a pigment dispersion, said pigment dispersion comprising said pigment and said additive in intimate contact.

13. The process of claim 9, wherein said additive is incorporated in said resin before or simultaneously with the addition of said pigment.

14. The process of claim 10, wherein said additive is incorporated in said resin before or simultaneously with the addition of said pigment.

15. The process of claim 9, wherein said additive is incorporated in said resin before the addition of said pigment.

16. The process of claim 10, wherein said additive is incorporated in said resin before the addition of said pigment.

17. The process of claim 9 which further comprises thermoforming the pigmented resin by injection molding or extrusion to a processed product or end product.

18. The process of claim 11 which further comprises thermoforming the pigmented resin by injection molding or extrusion to a processed product or end product.

19. The process of claim 9, wherein said pigment and additive are combined with the resin at a temperature above the softening point or melting point of the resin under conditions of high shear in a Banbury mixer or mixing extruder.

20. The process of claim 11, wherein said pigment dispersion is combined with the resin at a temperature above the softening point or melting point of the resin under conditions of high shear in a Banbury mixer or mixing extruder.

21. The process according to claim 9, wherein said additive is mixed with the pigment at the time of or after embedding into the plastic.

22. The process according to claim 11, wherein said additive is mixed with the pigment as a sludge or press cake before drying or with the pigment after drying.

23. The process of claim 21, wherein said boric acid is 3–10% by weight.

24. The process of claim 22, wherein said boric acid is 3–10% by weight.

25. The process of claim 21, wherein said pigment is chromium yellow or molybdate red pigment.

26. The process of claim 22, wherein said pigment is a chromium yellow or molybdate red pigment.

27. The process of claim 21, wherein said pigment is an organic pigment or metal oxide pigment.

28. The process of claim 22, wherein said pigment is an organic pigment or metal oxide pigment.

29. The process of claim 21, wherein said pigment is a lead chromate pigment.

30. The process of claim 22, wherein said pigment is a lead chromate pigment.

31. The use of the process of claim 21, wherein said pigment and additive is the total or main pigment contents.

32. The use of the process of claim 22, wherein said pigment and additive is the total or main pigment contents.

* * * * *